(12) United States Patent
Takubo et al.

(10) Patent No.: US 11,712,605 B2
(45) Date of Patent: Aug. 1, 2023

(54) GOLF BALL

(71) Applicant: Sumitomo Rubber Industries, Ltd., Kobe (JP)

(72) Inventors: Toshiyuki Takubo, Kobe (JP); Takahiro Sajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 4 days.

(21) Appl. No.: 17/534,453

(22) Filed: Nov. 24, 2021

(65) Prior Publication Data

US 2022/0193495 A1    Jun. 23, 2022

(30) Foreign Application Priority Data

Dec. 21, 2020 (JP) .................. 2020-211167

(51) Int. Cl.
| | |
|---|---|
| *A63B 37/06* | (2006.01) |
| *A63B 37/00* | (2006.01) |
| *C08L 33/08* | (2006.01) |
| *C08K 13/02* | (2006.01) |

(52) U.S. Cl.
CPC ...... *A63B 37/0075* (2013.01); *A63B 37/0033* (2013.01); *A63B 37/0043* (2013.01); *A63B 37/0045* (2013.01); *A63B 37/0063* (2013.01); *A63B 37/0065* (2013.01); *A63B 37/0087* (2013.01); *A63B 37/00621* (2020.08); *A63B 37/00622* (2020.08); *C08K 13/02* (2013.01); *C08L 33/08* (2013.01); *C08L 2205/025* (2013.01); *C08L 2205/03* (2013.01)

(58) Field of Classification Search
CPC ............ A63B 37/0081; A63B 37/0087; A63B 37/0092
USPC ......................................... 473/373
See application file for complete search history.

(56) References Cited

U.S. PATENT DOCUMENTS

| | | | |
|---|---|---|---|
| 2016/0184658 A1* | 6/2016 | Kamino | A63B 37/00622 473/374 |
| 2018/0161634 A1 | 6/2018 | Takihara et al. | |
| 2020/0155905 A1* | 5/2020 | Watanabe | A63B 37/00921 |

FOREIGN PATENT DOCUMENTS

JP        2018-93998 A    6/2018

* cited by examiner

*Primary Examiner* — Raeann Gorden
(74) *Attorney, Agent, or Firm* — Xsensus LLP

(57) ABSTRACT

A golf ball includes a core, a mid layer, and a cover. An amount of compressive deformation C3 of the golf ball can be not less than 2.80 mm. The golf ball can satisfy the following mathematical formulas (1) and (2):

$$C1 > (124.8 - Hs)/11.5 \qquad (1)$$

$$C2 - C1 \geq (-1/6 * C1 + (68 - H2)/20 + (5 - Hd)/100) * T2 \qquad (2), \text{where}$$

C1 is an amount of compressive deformation (mm) of the core,
C2 is an amount of compressive deformation (mm) of a sphere including the core and the mid layer,
Hd is Hs−Ho,
Ho is a hardness (Shore C) of a center the core,
Hs is a hardness (Shore C) of a surface of the core,
H2 is a hardness (Shore D) of the mid layer, and
T2 is a thickness (mm) of the mid layer.

7 Claims, 1 Drawing Sheet

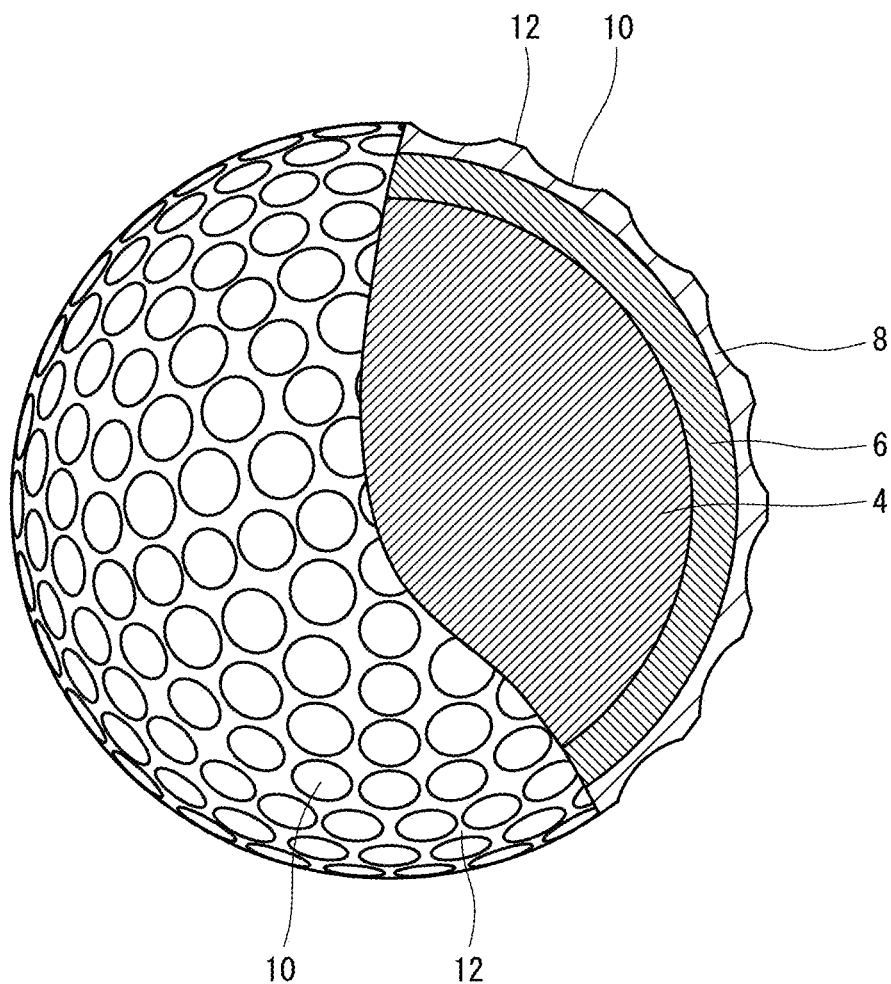

GOLF BALL

CROSS-REFERENCE TO RELATED APPLICATION

This application claims priority to and the benefit of Japanese Patent Application No. 2020-211167, filed on Dec. 21, 2020, the entire disclosure of which is incorporated herein by reference.

BACKGROUND

Field

Embodiments of the present disclosure relate to golf balls. Specifically, embodiments of the present disclosure relate to golf balls including a core, a mid layer, and a cover.

Description of the Related Art

A typical golf ball includes a core, a mid layer, and a cover. The core may be formed by crosslinking a rubber composition. The core may include two or more layers. The mid layer may be formed from a resin composition. The cover may be formed from another resin composition.

The face of a golf club has a loft angle. When a golf ball is hit with the golf club, the golf ball is launched at a launch angle corresponding to the loft angle. Also, the loft angle can cause backspin on the golf ball. The golf ball flies with the backspin.

One particular interest to golf players concerning golf balls is flight performance. Golf players may place importance on flight distances upon shots with drivers. Players with average golf skills may place importance also on flight distances upon shots with middle irons. Golf balls with which a great flight distance is achieved upon a shot with a middle iron can contribute to a good score. An appropriate trajectory height can achieve a great flight distance. The trajectory height can depend on a launch angle and a spin rate.

Another interest to golf players concerning golf balls is a feel at impact. Generally speaking, golf players may prefer a soft feel at impact. Players with average golf skills may place importance on a feel at impact upon putting.

Various improvements on the structures and materials of golf balls have been proposed for the purpose of improving various performances of golf balls. Japanese Laid-Open Patent Application Publication No. 2018-93998 discloses one example of such improvements.

Golf players' requirements for golf balls have been escalating more and more.

SUMMARY

A golf ball according to embodiments of the present disclosure can include a core, a mid layer positioned outside the core, and a cover positioned outside the mid layer. An amount of compressive deformation C3 of the golf ball can be not less than 2.80 mm. The golf ball can satisfy the following mathematical formulas (1) and (2):

$$C1 > (124.8 - Hs)/11.5 \quad (1)$$

$$C2 - C1 \geq (-1/6 \cdot C1 + (68 - H2)/20 + (5 - Hd)/100) \cdot T2 \quad (2),$$ where C1 is an amount of compressive deformation (mm) of the core, C2 is an amount of compressive deformation (mm) of a sphere including the core and the mid layer, Hd is Hs−Ho, Ho is a hardness (Shore C) of a center the core, Hs is a hardness (Shore C) of a surface of the core, H2 is a hardness (Shore D) of the mid layer, and T2 is a thickness (mm) of the mid layer.

The golf ball can further satisfy the following mathematical formula (3):

$$(C2 - C1)/(C3 - C2) \geq 1.60 \quad (3)$$

A difference Hd between the hardness Hs (Shore C) of the surface of the core and the hardness Ho (Shore C) of the center of the core can be not less than 15 and not greater than 40. Preferably, a sum (T2+T3) of the thickness T2 (mm) of the mid layer and a thickness T3 (mm) of the cover is not less than 1.0 mm and not greater than 4.5 mm.

The hardness H2 (Shore D) of the mid layer may be not less than 45.

A material of the cover may be a resin composition, where a base material of the resin composition can be an ionomer resin.

A material of the mid layer may be a resin composition, where a base material of the resin composition can be an ionomer resin.

A difference (H3−H2) between a hardness H3 of the cover and the hardness H2 of the mid layer may be not greater than −11.

BRIEF DESCRIPTION OF THE DRAWINGS

The FIGURE is a partially cutaway cross-sectional view of a golf ball according to one embodiment of the present disclosure.

DETAILED DESCRIPTION

Hereinafter, embodiments of the present disclosure will be described in detail based on preferred embodiments with appropriate reference to the accompanying drawing (the FIGURE). An object of embodiments of the present disclosure, among other objects, can be to provide a golf ball that has excellent flight performance upon a shot with a middle iron and/or an excellent feel at impact upon putting.

When the golf ball according to embodiments of the present disclosure is hit with a middle iron, the golf ball can be launched with a relatively low spin rate. The golf ball can achieve an appropriate trajectory height. The golf ball can achieve a relatively long flight distance upon a shot with a middle iron. When the golf ball is hit with a putter, the impact shock may be relatively small. The golf ball can allow a golf player to have a soft feel at impact upon putting. The flight performance and feel at impact of the golf ball can both be excellent.

The FIGURE shows a golf ball 2. The golf ball 2 can include a spherical core 4, a mid layer 6 positioned outside the core 4, and a cover 8 positioned outside the mid layer 6. The golf ball 2 can include a plurality of dimples 10 on the surface thereof. Of the surface of the golf ball 2, a part other than the dimples 10 can be a land 12. The golf ball 2 can include a paint layer and a mark layer on the external side of the cover 8.

The golf ball 2 can have a diameter of not less than 40 mm and not greater than 45 mm. From the viewpoint of conformity to the rules established by the United States Golf Association (USGA), the diameter can be particularly not less than 42.67 mm, for instance. In light of suppression of air resistance, the diameter can be not greater than 44 mm, for instance, not greater than 42.80 mm.

The golf ball 2 can have a mass of not less than 40 g and not greater than 50 g. In light of attainment of great inertia, the mass can be not less than 44 g, for instance, not less than 45.00 g. From the viewpoint of conformity to the rules established by the USGA, the mass can be not greater than 45.93 g.

The core 4 can be formed by crosslinking a rubber composition. Examples of the base rubber of the rubber composition include polybutadienes, polyisoprenes, styrene-butadiene copolymers, ethylene-propylene-diene copolymers, and natural rubbers. In light of the resilience performance of the golf ball 2, polybutadienes can be used. In a case where a polybutadiene and another rubber are used in combination, the polybutadiene can be a principal component. Specifically, the proportion of the polybutadiene to the entire base rubber can be not less than 50% by mass, for instance, not less than 80% by mass. A polybutadiene in which the proportion of cis-1,4 bonds is not less than 80% can be used.

The rubber composition of the core 4 can contain a co-crosslinking agent. Co-crosslinking agents in light of the durability and resilience performance of the golf ball 2 can be monovalent or bivalent metal salts of an $\alpha,\beta$-unsaturated carboxylic acid having 2 to 8 carbon atoms, for instance. Examples of co-crosslinking agents include zinc acrylate, magnesium acrylate, zinc methacrylate, and magnesium methacrylate. Zinc acrylate and zinc methacrylate may be preferable, for instance.

The rubber composition may contain a metal oxide and an $\alpha,\beta$-unsaturated carboxylic acid having 2 to 8 carbon atoms, for instance. They react with each other in the rubber composition, and thereby a salt can be obtained. The obtained salt can serve as a co-crosslinking agent. Examples of $\alpha,\beta$-unsaturated carboxylic acids include acrylic acid and methacrylic acid. Examples of metal oxides include zinc oxide and magnesium oxide.

The amount of the co-crosslinking agent per 100 parts by mass of the base rubber can be not less than 10 parts by mass and not greater than 45 parts by mass. The golf ball 2 in which this amount is not less than 10 parts by mass may be characterized as having excellent resilience performance. From this viewpoint, this amount can be not less than 15 parts by mass, for instance, not less than 20 parts by mass. The golf ball 2 in which this amount is not greater than 45 parts by mass may be characterized as having an excellent feel at impact. From this viewpoint, this amount may be not greater than 40 parts by mass, for instance, not greater than 35 parts by mass.

The rubber composition of the core 4 can contain an organic peroxide. The organic peroxide can serve as a crosslinking initiator. The organic peroxide can contribute to the durability and resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. An organic peroxide with particularly high versatility can be dicumyl peroxide.

The amount of the organic peroxide per 100 parts by mass of the base rubber can be not less than 0.1 parts by mass and not greater than 3.0 parts by mass. The golf ball 2 in which this amount is not less than 0.1 parts by mass may be characterized as having excellent resilience performance. From this viewpoint, this amount can be not less than 0.3 parts by mass, for instance, not less than 0.5 parts by mass. The golf ball 2 in which this amount is not greater than 3.0 parts by mass may be characterized as having an excellent feel at impact. From this viewpoint, this amount can be not greater than 2.5 parts by mass, for instance, not greater than 2.0 parts by mass.

The rubber composition of the core 4 can contain an organic sulfur compound. The organic sulfur compound can contribute to flight distance upon a shot with a driver. Examples of organic sulfur compounds include naphthalenethiol compounds, benzenethiol compounds, and disulfide compounds.

Examples of naphthalenethiol compounds include 1-naphthalenethiol, 2-naphthalenethiol, 4-chloro-1-naphthalenethiol, 4-bromo-1-naphthalenethiol, 1-chloro-2-naphthalenethiol, 1-bromo-2-naphthalenethiol, 1-fluoro-2-naphthalenethiol, 1-cyano-2-naphthalenethiol, 1-acetyl-2-naphthalenethiol, and metal salts of these. Here, metal salts can be zinc salts.

Examples of benzenethiol compounds include benzenethiol, 4-chlorobenzenethiol, 3-chlorobenzenethiol, 4-bromobenzenethiol, 3-bromobenzenethiol, 4-fluorobenzenethiol, 4-iodobenzenethiol, 2,5-dichlorobenzenethiol, 3,5-dichlorobenzenethiol, 2,6-dichlorobenzenethiol, 2,5-dibromobenzenethiol, 3,5-dibromobenzenethiol, 2-chloro-5-bromobenzenethiol, 2,4,6-trichlorobenzenethiol, 2,3,4,5,6-pentachlorobenzenethiol, 2,3,4,5,6-pentafluorobenzenethiol, 4-cyanobenzenethiol, 2-cyanobenzenethiol, 4-nitrobenzenethiol, 2-nitrobenzenethiol, and metal salts of these. Here, metal salts can be zinc salts.

Examples of disulfide compounds include diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, bis(4-cyanophenyl)disulfide, bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, bis(2-cyano-5-bromophenyl)disulfide, bis(2,4,6-trichlorophenyl)disulfide, bis(2-cyano-4-chloro-6-bromophenyl)disulfide, bis(2,3,5,6-tetrachlorophenyl)disulfide, bis(2,3,4,5,6-pentachlorophenyl)disulfide, and bis(2,3,4,5,6-pentabromophenyl)disulfide.

The amount of the organic sulfur compound per 100 parts by mass of the base rubber can be not less than 0.1 parts by mass and not greater than 1.5 parts by mass. The golf ball 2 in which this amount is not less than 0.1 parts by mass may be characterized as having excellent resilience performance. From this viewpoint, this amount can be not less than 0.2 parts by mass, for instance, not less than 0.3 parts by mass. The golf ball 2 in which this amount is not greater than 1.5 parts by mass may be characterized as having an excellent feel at impact. From this viewpoint, this amount can be not greater than 1.3 parts by mass, for instance, not greater than 1.1 parts by mass. Two or more organic sulfur compounds may be used in combination.

The rubber composition of the core 4 can contain a carboxylic acid or a carboxylate. The carboxylic acid and the carboxylate can contribute to making the hardness distribution of the core 4 appropriate. Appropriate hardness distribution of the core 4 can suppress the spin rate upon a shot with a middle iron. An example of carboxylic acids is benzoic acid. Examples of carboxylates include zinc octoate and zinc stearate. The amount of the carboxylic acid or the carboxylate per 100 parts by mass of the base rubber can be not less than 0.5 parts by mass, for instance, not less than 0.8 parts by mass, and such as not less than 1.0 part by mass. This amount can be not greater than 20 parts by mass, for instance, not greater than 15 parts by mass, such as not greater than 10 parts by mass.

The rubber composition of the core 4 may contain a filler for the purpose of, for example, specific gravity adjustment. Examples of suitable fillers include zinc oxide, barium sulfate, calcium carbonate, and magnesium carbonate. The amount of the filler can be suitably determined, such that the intended specific gravity of the core 4 is achieved.

The rubber composition of the core 4 may contain a suitable amount of various additives, such as sulfur, antioxidant, colorant, plasticizer, dispersant, etc. The rubber composition may contain crosslinked rubber powder or synthetic resin powder.

The core 4 can have a diameter of not less than 35.0 mm and not greater than 40.5 mm. The golf ball 2 that includes the core 4 having a diameter of not less than 35.0 mm may be characterized as having excellent resilience performance. In light of this, the diameter may be not less than 36.0 mm, for instance, not less than 36.5 mm. The golf ball 2 that includes the core 4 having a diameter of not greater than 40.5 mm may be characterized as having excellent durability. In light of this, the diameter can be not greater than 40.0 mm, for instance, not greater than 39.5 mm.

The center of the core 4 can have a hardness Ho of not less than 35 and not greater than 80. The golf ball 2 in which the hardness Ho is not less than 35 may be characterized as having excellent resilience performance. In light of this, the hardness Ho can be not less than 40, for instance, not less than 45. The golf ball 2 in which the hardness Ho is not greater than 80 may be characterized as having an excellent feel at impact. In light of this, the hardness Ho can be not greater than 70, for instance, not greater than 65.

The hardness Ho can be measured with a Shore C type hardness scale mounted to an automated hardness meter (trade name "digi test II", available from Heinrich Bareiss Prüfgerätebau GmbH). The hardness scale can be pressed against the central point of the cross-section of a hemisphere obtained by cutting the golf ball 2. The measurement can be performed in an environment of 23° C.

The surface of the core 4 can have a hardness Hs of not less than 65 and not greater than 95. The golf ball 2 in which the hardness Hs is not less than 65 may be characterized as having excellent resilience performance. In light of this, the hardness Hs can be not less than 67, for instance, not less than 69. The golf ball 2 in which the hardness Hs is not greater than 95 may be characterized as having an excellent feel at impact. In light of this, the hardness Hs can be not greater than 93, for instance, not greater than 91.

The hardness Hs can be measured with a Shore C type hardness scale mounted to an automated hardness meter (trade name "digi test II", available from Heinrich Bareiss Prüfgerätebau GmbH). The hardness scale can be pressed against the surface of the core 4. The measurement can be performed in an environment of 23° C.

A difference Hd (=Hs−Ho) between the hardness Hs of the surface of the core 4 and the hardness Ho of the center of the core 4 can be not less than 15 and not greater than 40. In a case where the golf ball 2 includes the core 4 in which the difference Hd is not less than 15, the spin of the golf ball 2 upon a shot with a middle iron can be suppressed. When the golf ball 2 is hit with a middle iron, the flight distance can be relatively long. In light of this, the difference Hd can be not less than 18, for instance, not less than 20. The core 4 in which the difference Hd is not greater than 40 may be characterized as having excellent durability. In light of this, the difference Hd can be not greater than 37, for instance, not greater than 35.

The core 4 can have an amount of compressive deformation C1 of not less than 3.2 mm and not greater than 5.2 mm. The golf ball 2 that includes the core 4 having an amount of compressive deformation C1 of not less than 3.2 mm may be characterized as having an excellent feel at impact. In light of this, the amount of compressive deformation C1 can be not less than 3.4 mm, for instance, not less than 3.6 mm. When the golf ball 2 that includes the core 4 having an amount of compressive deformation C1 of not greater than 5.2 mm is hit with a middle iron, the golf ball 2 can be launched at a relatively high initial speed. In light of this, the amount of compressive deformation C1 can be not greater than 5.0 mm, for instance, not greater than 4.8 mm.

For measurement of the amount of compressive deformation C1, a YAMADA type compression tester "SCH" can be used. In the tester, the core 4 can be placed on a hard plate made of metal. A cylinder made of metal can gradually descend toward the core 4. The core 4 can be squeezed between the bottom face of the cylinder and the hard plate, and become deformed. A moving distance of the cylinder, starting from a state in which an initial load of 98 N is applied to the core 4 up to a state in which a final load of 1274 N is applied thereto, can be measured. A moving speed of the cylinder until the initial load is applied can be 0.83 mm/s. A moving speed of the cylinder after the initial load is applied until the final load is applied can be 1.67 mm/s.

Compression molding may be suitable for obtaining the core 4. In the compression molding, the rubber composition can be placed into a mold having a cavity. The rubber composition can be pressurized and heated in the cavity. Due to the pressurization, the rubber composition can flow within the cavity. Due to the heating, the crosslinking reaction of the rubber can occur. As previously described, in light of spin suppression, the difference Hd between the hardness Hs of the surface of the core 4 and the hardness Ho of the center of the core 4 can be not less than 15. In other words, in light of flight performance, the hardness difference Hd can be relatively large. In the compression molding, by pressurizing the rubber composition at a relatively low pressure and heating the rubber composition at a relatively high temperature, a relatively large hardness difference Hd can be achieved. The compression molding may be achieved through a plurality of stages.

The mid layer 6 can be positioned outside the core 4. The mid layer 6 can be formed from a thermoplastic resin composition. Examples of the base polymer of the resin composition include ionomer resins, thermoplastic polyester elastomers, thermoplastic polyamide elastomers, thermoplastic polyurethane elastomers, thermoplastic polyolefin elastomers, and thermoplastic polystyrene elastomers. Ionomer resins are particularly preferable. Ionomer resins may be highly elastic. The golf ball 2 that includes the mid layer 6 containing an ionomer resin may be characterized as having excellent resilience performance, and/or may be characterized as having excellent flight performance upon a shot with a driver.

An ionomer resin and another resin may be used in combination. In the case of such a combined use, in light of resilience performance, the ionomer resin can be contained in the base polymer as a principal component. The proportion of the ionomer resin to the entire base polymer can be not less than 50% by mass.

Examples of ionomer resins include binary copolymers formed with an α-olefin and an α,β-unsaturated carboxylic acid having 3 to 8 carbon atoms, for instance. A binary copolymer can contain not less than 80% by mass and not greater than 90% by mass of an α-olefin and not less than 10% by mass and not greater than 20% by mass of an α,β-unsaturated carboxylic acid, for instance. The binary copolymer may be characterized as having excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A ternary copolymer can contain not less than 70% by mass and not greater than 85% by mass of an α-olefin, not less than 5% by mass and not greater than 30% by mass of an α,β-unsaturated carboxylic acid, and not less than 1% by mass and not greater than 25% by mass of an α,β-unsaturated carboxylate ester, for instance. The ternary copolymer may be characterized as having excellent resilience performance. For the binary copolymer and the ternary copolymer, α-olefins can be ethylene and propylene, while α,β-unsaturated carboxylic acids can be acrylic acid and methacrylic acid. A particular ionomer resin can be a copolymer formed with ethylene and acrylic acid. Another particular ionomer resin can be a copolymer formed with ethylene and methacrylic acid.

In the binary copolymer and the ternary copolymer, some of the carboxyl groups may be neutralized with metal ions. Examples of metal ions for use in neutralization include sodium ions, potassium ions, lithium ions, zinc ions, calcium ions, magnesium ions, aluminum ions, and neodymium ions. The neutralization may be carried out with two or more types of metal ions. Suitable metal ions in light of the resilience performance and durability of the golf ball 2 can be sodium ions, zinc ions, lithium ions, and magnesium ions.

Specific examples of ionomer resins include trade names "Himilan 1555", "Himilan 1557", "Himilan 1605", "Himilan 1706", "Himilan 1707", "Himilan 1855", "Himilan 1856", "Himilan 8150", "Himilan AM7311", "Himilan AM7315", "Himilan AM7317", "Himilan AM7329", and "Himilan AM7337", available from DOW-MITSUI POLYCHEMICALS CO., LTD.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", available from DuPont; and trade names "IOTEK 7010", "IOTEK 7030", "IOTEK 7510", "IOTEK 7520", "IOTEK 8000", and "IOTEK 8030", available from ExxonMobil Chemical Corporation. Two or more ionomer resins may be used in combination.

The resin composition of the mid layer 6 may contain a suitable amount of colorant, filler, dispersant, antioxidant, ultraviolet absorber, light stabilizer, fluorescent agent, fluorescent brightener, etc. In a case where the hue of the golf ball 2 is white, a typical colorant can be titanium dioxide.

The mid layer 6 can have a thickness T2 of not less than 0.50 mm and not greater than 2.50 mm. The golf ball 2 in which the thickness T2 is not less than 0.50 mm may be characterized as having excellent resilience performance. In light of this, the thickness T2 can be not less than 0.70 mm, for instance, not less than 0.90 mm. The golf ball 2 in which the thickness T2 is not greater than 2.50 mm may be characterized as having an excellent feel at impact. In light of this, the thickness T2 can be not greater than 2.30 mm, for instance, not greater than 2.10 mm. The thickness T2 can be measured at a position immediately below the land 12.

The mid layer 6 can have a hardness H2 of not less than 45 and not greater than 75. The golf ball 2 in which the hardness H2 is not less than 45 may be characterized as having excellent resilience performance. In light of this, the hardness H2 can be not less than 53, for instance, not less than 60. The golf ball 2 in which the hardness H2 is not greater than 75 may be characterized as having an excellent feel at impact. In light of this, the hardness H2 can be not greater than 72, for instance, not greater than 70.

The hardness H2 of the mid layer 6 can be in accordance with the standards of "ASTM-D 2240-68." The hardness H2 can be measured with a Shore D type hardness scale mounted to an automated hardness meter (trade name "digi test II," available from Heinrich Bareiss Prüfgerätebau GmbH). For the measurement, as an example, a sheet that is formed from the same material as that of the mid layer 6 by hot pressing, the sheet having a thickness of about 2 mm, can be used. Prior to the measurement, the sheet can be stored at 23° C. for two weeks, for instance. At the measurement, three of these sheets can be stacked together.

A sphere including the core 4 and the mid layer 6 can have an amount of compressive deformation C2 of not less than 2.6 mm and not greater than 4.5 mm. The golf ball 2 that includes the sphere having an amount of compressive deformation C2 of not less than 2.6 mm may be characterized as having an excellent feel at impact. In light of this, the amount of compressive deformation C2 can be not less than 2.8 mm, for instance, not less than 2.9 mm. When the golf ball 2 that includes the sphere having an amount of compressive deformation C2 of not greater than 4.5 mm is hit with a middle iron, the golf ball 2 can be launched at a relatively high initial speed. In light of this, the amount of compressive deformation C2 can be not greater than 4.2 mm, for instance, not greater than 4.0 mm.

For measurement of the amount of compressive deformation C2, the aforementioned YAMADA type compression tester "SCH" can be used. In the tester, the sphere can be placed on a hard plate made of metal. A cylinder made of metal can gradually descend toward the sphere. The sphere can be squeezed between the bottom face of the cylinder and the hard plate, and can become deformed. A moving distance of the cylinder, starting from a state in which an initial load of 98 N is applied to the sphere up to a state in which a final load of 1274 N is applied thereto, can be measured. A moving speed of the cylinder until the initial load is applied can be 0.83 mm/s. A moving speed of the cylinder after the initial load is applied until the final load is applied can be 1.67 mm/s.

A difference (C2−C1) between the amount of compressive deformation C2 of the sphere and the amount of compressive deformation C1 of the core 4 can be not less than −1.2 and not greater than −0.2. When the golf ball 2 in which the difference (C2−C1) is within this range is hit with a middle iron, the golf ball 2 can be launched at a relatively high initial speed. In light of this, the difference (C2−C1) can be not less than −1.1, for instance, not less than −1.0. The difference (C2−C1) can be not greater than −0.3, for instance, not greater than −0.4.

The cover 8 can be positioned outside the mid layer 6. The cover 8 can be formed from a thermoplastic resin composition. Examples of the base polymer of the resin composition include ionomer resins, thermoplastic polyester elastomers, thermoplastic polyamide elastomers, thermoplastic polyurethane elastomers, thermoplastic polyolefin elastomers, and thermoplastic polystyrene elastomers. Ionomer resins can be particularly used, for instance. Ionomer resins can be highly elastic. The golf ball 2 that includes the cover 8 containing an ionomer resin may be characterized as having excellent resilience performance, and/or may be characterized as having excellent flight performance upon a shot with a driver. The ionomer resin mentioned above for the mid layer 6 can be used for the cover 8.

An ionomer resin and another resin may be used in combination. In the case of such a combined use, in light of resilience performance, the ionomer resin can be contained in the base polymer as a principal component. The proportion of the ionomer resin to the entire base polymer can be not less than 50% by mass, for instance, not less than 70% by mass, such as not less than 80% by mass.

A resin that can be used in combination with the ionomer resin can be an ethylene-(meth)acrylic acid copolymer. The copolymer can be obtained as a result of copolymerization reaction of a monomer composition containing ethylene and (meth)acrylic acid. In the copolymer, some of the carboxyl groups can be neutralized with metal ions. The copolymer can contain not less than 3% by mass and not greater than 25% by mass of a (meth)acrylic acid component. Particularly, as an example, the ethylene-(meth)acrylic acid copolymer can contain a polar functional group. Specific examples of ethylene-(meth)acrylic acid copolymers include trade name "NUCREL", available from DOW-MITSUI POLYCHEMICALS CO., LTD.

The resin composition of the cover 8 may contain a styrene block-containing thermoplastic elastomer. The styrene block-containing thermoplastic elastomer can contain a polystyrene block as a hard segment, and also can contain a soft segment. A typical soft segment can be a diene block. Examples of compounds of the diene block include butadiene, isoprene, 1,3-pentadiene, and 2,3-dimethyl-1,3-butadiene. Butadiene and isoprene can be used, in particular. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of the resilience performance of the golf ball 2, the content of the styrene component in the styrene block-containing thermoplastic elastomer can be not less than 1% by mass, for instance, not less than 3% by mass, and such as not less than 5% by mass. In light of the feel at impact of the golf ball 2, the content can be not greater than 50% by mass, for instance, not greater than 47% by mass, such as not greater than 45% by mass.

In embodiments the present disclosure, the styrene block-containing thermoplastic elastomer can contain an alloy of an olefin and one or more members selected from the group consisting of SBS, SIS, SIBS, SEBS, SEPS, and SEEPS. The olefin component in the alloy can be presumed to contribute to improvement of compatibility with another base polymer. The alloy can contribute to the resilience performance of the golf ball 2. An olefin having 2 to 10 carbon atoms, for instance, can be used. Examples of suitable olefins include ethylene, propylene, butene, and pentene. Ethylene and propylene may, in particular, be used.

[0063] Specific examples of polymer alloys include trade names "TEFABLOC T3221C", "TEFABLOC T3339C", "TEFABLOC SJ4400N", "TEFABLOC SJ5400N", "TEFABLOC SJ6400N", "TEFABLOC SJ7400N", "TEFABLOC SJ8400N", "TEFABLOC SJ9400N", and "TEFABLOC SR04", available from Mitsubishi Chemical Corporation. Other specific examples of styrene block-containing thermoplastic elastomers include trade name "Epofriend A1010", available from Daicel Corporation, and trade name "SEPTON HG-252", available from Kuraray Co., Ltd.

The resin composition of the cover 8 may contain a suitable amount of colorant, filler, dispersant, antioxidant, ultraviolet absorber, light stabilizer, fluorescent agent, fluorescent brightener, etc. In a case where the hue of the golf ball 2 is white, a typical colorant can be titanium dioxide.

The cover 8 can have a thickness T3 of not less than 0.50 mm and not greater than 2.50 mm. In a case where the thickness T3 is not less than 0.50 mm, the cover 8 can contribute to the feel at impact of the golf ball 2. In light of this, the thickness T3 can be not less than 0.70 mm, for instance, not less than 0.90 mm. In a case where the thickness T3 is not greater than 2.50 mm, the cover 8 may not impair the resilience performance of the golf ball 2. In light of this, the thickness T3 can be not greater than 2.30 mm, for instance, not greater than 2.10 mm. The thickness T3 can be measured at a position immediately below the land 12.

The cover 8 can have a hardness H3 of not less than 30 and not greater than 60. The golf ball 2 in which the hardness H3 is not less than 30 may be characterized as having excellent resilience performance. In light of this, the hardness H3 can be not less than 33, for instance, not less than 35. When the golf ball 2 in which the hardness H3 is not greater than 60 is hit with a putter, the impact shock may be relatively small. The golf ball 2 may be characterized as having an excellent feel at impact. In light of this, the hardness H3 can be not greater than 57, for instance, not greater than 55.

The hardness H3 of the cover 8 can be measured in accordance with the standards of "ASTM-D 2240-68". The hardness H3 can be measured with a Shore D type hardness scale mounted to an automated hardness meter (trade name "digi test II", available from Heinrich Bareiss Prüfgerätebau GmbH). For the measurement, as an example, a sheet that is formed from the same material as that of the cover 8 by hot pressing, the sheet having a thickness of about 2 mm, can be used. Prior to the measurement, the sheet can be stored at 23° C. for two weeks, for instance. At the measurement, three of these sheets can be stacked together.

The golf ball 2 can have an amount of compressive deformation C3 of not less than 2.8 mm and not greater than 4.2 mm. The golf ball 2 having an amount of compressive deformation C3 of not less than 2.8 mm may be characterized as having an excellent feel at impact upon putting. In light of this, the amount of compressive deformation C3 can be not less than 2.9 mm, for instance, not less than 3.0 mm. When the golf ball 2 having an amount of compressive deformation C3 of not greater than 4.2 mm is hit with a middle iron, the golf ball 2 can be launched at a relatively high initial speed. In light of this, the amount of compressive deformation C3 can be not greater than 4.1 mm, for instance, not greater than 4.0 mm.

For measurement of the amount of compressive deformation C3, the aforementioned YAMADA type compression tester "SCH" can be used. In the tester, the golf ball 2 can be placed on a hard plate made of metal. A cylinder made of metal can gradually descend toward the golf ball 2. The golf ball 2 can be squeezed between the bottom face of the cylinder and the hard plate, and can become deformed. A moving distance of the cylinder, starting from a state in which an initial load of 98 N is applied to the golf ball 2 up to a state in which a final load of 1274 N is applied thereto, can be measured. A moving speed of the cylinder until the initial load is applied can be 0.83 mm/s. A moving speed of the cylinder after the initial load is applied until the final load is applied can be 1.67 mm/s.

A sum (T2+T3) of the thickness T2 (mm) of the mid layer 6 and the thickness T3 (mm) of the cover 8 can be not less than 1.0 mm and not greater than 4.5 mm. The golf ball 2 in which the sum (T2+T3) is within this range can be characterized as having excellent flight performance upon a shot with a middle iron, and can be characterized as having an excellent feel at impact upon putting. In light of this, the sum (T2+T3) can be not less than 1.5 mm, for instance, not less than 2.0 mm. The sum (T2+T3) can be not greater than 4.0 mm, for instance, not greater than 3.5 mm.

A difference (H3−H2) between the hardness H3 of the cover 8 and the hardness H2 of the mid layer 6 can be not greater than −11. The golf ball 2 in which the difference (H3−H2) is not greater than −11 may be characterized as having excellent flight performance upon a shot with a middle iron, and/or may be characterized as having an excellent feel at impact upon putting. In light of this, the difference (H3−H2) can be not greater than −13, for instance, not greater than −15. The difference (H3−H2) can be not less than −30.

A difference (C3−C2) between the amount of compressive deformation C3 of the golf ball 2 and the amount of compressive deformation C2 of the sphere including the core 4 and the mid layer 6 can be not less than −0.60 and not greater than −0.10. When the golf ball 2 in which the difference (C3−C2) is within this range is hit with a middle iron, the golf ball 2 can be launched at a relatively high initial speed. In light of this, the difference (C3−C2) can be not less than −0.55, for instance, not less than −0.50. The difference (C3−C2) can be not greater than −0.15, for instance, not greater than −0.20.

In embodiments of the present disclosure, a value Vx can be calculated by a mathematical formula shown below.

$$Vx=(124.8-Hs)/11.5$$

The amount of compressive deformation C1 of the core 4 can be greater than the value Vx. In other words, the golf ball 2 can satisfy a mathematical formula (1) shown below.

$$C1>(124.8-Hs)/11.5 \quad (1)$$

In the golf ball 2 satisfying the above mathematical formula (1), the difference Hd between the surface hardness Hs of the core 4 and the center hardness Ho of the core 4 can be relatively large. When the golf ball 2 is hit with a middle iron, the spin rate can be relatively low. The golf ball 2 may be characterized as having excellent flight performance upon a shot with a middle iron. When the golf ball 2 is hit with a putter, the impact shock can be relatively small. The golf ball 2 can allow a golf player to have an excellent feel at impact upon putting. The flight performance and feel at impact of the golf ball 2 can both be characterized as excellent.

In light of flight performance and feel at impact, a difference (C1−Vx) between the amount of compressive deformation C1 and the value Vx can be not less than 0.05, for instance, not less than 0.08, such as not less than 0.10. The difference (C1−Vx) can be not greater than 1.00.

In embodiments of the present disclosure, a value Vy can be calculated by a mathematical formula shown below.

$$Vy=(-1/6*C1+(68-H2)/20+(5-Hd)/100)*T2$$

The difference (C2−C1) can be greater than or equal to the value Vy. In other words, the golf ball 2 can satisfy a mathematical formula (2) shown below.

$$C2-C1(-1/6*C1+(68-H2)/20+(5-Hd)/100)*T2 \quad (2)$$

When the golf ball 2 is hit with a middle iron, the spin rate can be relatively low. The golf ball 2 may be characterized as having excellent flight performance upon a shot with a middle iron.

In light of flight performance, a difference ((C2−C1)−Vy) between the difference (C2−C1) and the value Vy can be not less than 0.02, for instance, not less than 0.03, such as not less than 0.04. The difference ((C2−C1)−Vy) can be not greater than 0.3.

In embodiments of the present disclosure, a value Vz can be calculated by a mathematical formula shown below.

$$Vz=(C2-C1)/(C3-C2)$$

The value Vz can be not less than 1.60. In other words, the golf ball 2 can satisfy a mathematical formula (3) shown below.

$$(C2-C1)/(C3-C2) \geq 1.60 \quad (3)$$

When the golf ball 2 is hit with a middle iron, the spin rate can be relatively low. The golf ball 2 may be characterized as having excellent flight performance upon a shot with a middle iron. When the golf ball 2 is hit with a putter, the impact shock can be relatively small. The golf ball 2 can allow a golf player a have an excellent feel at impact upon putting. The flight performance and feel at impact of the golf ball 2 can both be characterized as excellent. In light of flight performance and feel at impact, the value Vz can be not less than 1.70, for instance, not less than 1.80. The value Vz can be not greater than 4.50.

EXAMPLES

Example 1

A rubber composition 1B was obtained by kneading 100 parts by mass of a high-cis polybutadiene (trade name "BR-730", available from JSR Corporation), 27 parts by mass of zinc diacrylate, 10 parts by mass of zinc oxide, 12.5 parts by mass of barium sulfate, 0.9 parts by mass of dicumyl peroxide, 0.9 parts by mass of pentachlorothiophenol zinc salt, and 2.0 parts by mass of benzoic acid. The rubber composition 1B was placed into a mold including upper and lower mold halves each having a hemispherical cavity. The rubber composition 1B was pressurized and heated under the conditions indicated below. As a result, a core with a diameter of 38.6 mm was obtained.

First Stage
Temperature: 120° C.
Pressure: 35 kgf/cm$^2$
Time: 5 minutes
Second Stage
Temperature: 150° C.
Pressure: 35 kgf/cm$^2$
Time: 20 minutes A resin composition 2A was obtained by kneading 50 parts by mass of an ionomer resin (the aforementioned "Himilan AM7329"), 25 parts by mass of another ionomer resin (the aforementioned "Himilan AM1605"), 25 parts by mass of yet another ionomer resin (the aforementioned "Surlyn 8150"), 7.5 parts by mass of barium sulfate, and 4 parts by mass of titanium dioxide with a twin-screw kneading extruder. The core was placed into a mold including upper and lower mold halves each having a hemispherical cavity. The core was covered with the resin composition 2A by injection molding to form a mid layer. The thickness of the mid layer was 1.00 mm.

A resin composition 3A was obtained by kneading 80 parts by mass of an ionomer resin (the aforementioned "Himilan 1855"), 20 parts by mass of an ethylene-(meth) acrylic acid copolymer (trade name "NUCREL N1050H", available from DOW-MITSUI POLYCHEMICALS CO., LTD.), 3 parts by mass of titanium dioxide, and 0.2 parts by mass of a light stabilizer (trade name "JF-90", available from Johoku Chemical Co., Ltd.) with a twin-screw kneading extruder. The sphere including the core and the mid layer was placed into a mold including upper and lower mold halves each having a hemispherical cavity. The sphere was covered with the resin composition 3A by injection molding to form a cover. The thickness of the cover was 1.05 mm.

A clear paint containing a two-component curing type polyurethane as a base material was applied to this cover, and thereby a golf ball of Example 1 with a diameter of about 42.7 mm and a mass of about 45.6 g was obtained.

Examples 2 to 20 and Comparative Example 1 to 8

Golf balls of Examples 2 to 20 and Comparative Examples 1 to 8 were obtained in the same manner as Example 1, except that the specifications of the core, the mid layer, and the cover were varied as shown in Tables 5 to 14 below. The details of the composition of the core are shown in Tables 1 and 2 below. The details of the composition of the mid layer are shown in Table 3 below. The details of the composition of the cover are shown in Table 4 below.

[Flight Test upon Shot with I #7]

An iron golf club (trade name "XXIO 11", available from Sumitomo Rubber Industries, Ltd., shaft hardness: R, #7) was attached to a swing machine available from Golf Laboratories, Inc. A golf balls was hit with the swing machine, under the condition of a head speed of 33 m/sec, and the spin rate and the flight distance were measured. The flight distance is the distance from the launch point to the stop point. During the test, the weather was almost windless. The average values of data obtained by 12 measurements were calculated. The difference between the calculated average value and the average value in Example 5 is shown in Tables 10 to 14 below.

[Evaluation of Flight Performance]

The above flight distance (average value) difference was evaluated by grading based on the criteria indicated below, and results of the evaluation are shown in Tables 10 to 14 below.
  A: greater than 1.2 yards
  B: greater than 0.4 yards and not greater than 1.2 yards
  C: not less than −0.4 yards and not greater than 0.4 yards
  D: not less than −1.2 yards and less than −0.4 yards
  E: less than −1.2 yards

[Evaluation of Feel at Impact]

Twenty different golf players hit each golf ball with a putter, and were asked whether the feel at impact upon putting was good. The evaluation of the feel at impact upon putting was graded as follows based on the number of golf players who answered, "the feel at impact was good". Results of the evaluation are shown in Tables 10 to 14 below.
  A: 18 players or more
  B: 14 to 17 players
  C: 10 to 13 players
  D: 6 to 9 players
  E: 5 players or less

[Overall Evaluation]

An overall evaluation that is a combination of the above evaluation of flight performance (first evaluation) and the above evaluation of feel at impact (second evaluation) was made by grading based on the criteria indicated below, and results of the overall evaluation are shown in Tables 10 to 14 below.
  A: Both the first and second evaluations fall within the range of "A" to "C".
  B: One of the first and second evaluations falls within the range of "A" to "C" whereas the other is "D".
  C: Both the first and second evaluations are "D".
  D: One of or both the first and second evaluations is/are

TABLE 1

| Composition of the Core (parts by mass) | | | | | | | |
|---|---|---|---|---|---|---|---|
|  | 1A | 1B | 1C | 1D | 1E | 1F | 1G |
| Polybutadiene | 100 | 100 | 100 | 100 | 100 | 100 | 100 |
| Zinc acrylate | 26.5 | 27 | 28.5 | 29 | 30.5 | 31 | 31 |
| Zinc oxide | 5 | 10 | 5 | 10 | 5 | 10 | 10 |
| Barium sulfate | 19.4 | 12.5 | 18.7 | 11.8 | 18 | 11 | 11.8 |
| Dicumyl peroxide | 0.9 | 0.9 | 0.9 | 0.9 | 0.9 | 0.9 | 0.9 |
| Pentachlorothiophenol zinc salt | 0.5 | 0.9 | 0.5 | 0.9 | 0.5 | 0.9 | 0.9 |
| Benzoic acid | — | 2.0 | — | 2.0 | — | 2.0 | 2.0 |

TABLE 2

| Composition of the Core (parts by mass) | | | | |
|---|---|---|---|---|
|  | 1H | 1I | 1J | 1K |
| Polybutadiene | 100 | 100 | 100 | 100 |
| Zinc acrylate | 33 | 33 | 35 | 35 |
| Zinc oxide | 10 | 10 | 10 | 10 |
| Barium sulfate | 11.8 | 12.8 | 11.8 | 12.5 |
| Dicumyl peroxide | 0.9 | 0.9 | 0.9 | 0.9 |
| Pentachlorothiophenol zinc salt | 0.9 | 0.9 | 0.9 | 0.9 |
| Benzoic acid | 2.0 | 2.0 | 2.0 | 2.0 |

TABLE 3

| Composition of the Mid Layer (parts by mass) | | | |
|---|---|---|---|
|  | 2A | 2B | 2C |
| Himilan A147329 | 50 | 40 | — |
| Himilan 1605 | 25 | 20 | — |
| Himilan 1555 | — | 40 | 49 |
| Himilan 1557 | — | — | 48 |
| Surlyn 8150 | 25 | — | — |
| TEFABLOC T3221C | — | — | 3 |
| Barium sulfate | 7.5 | — | — |
| Titanium dioxide | 4 | 3 | 3 |
| H2 (Shore D) | 68 | 63 | 59 |

TABLE 4

| Composition of the Cover (parts by mass) | | | |
|---|---|---|---|
|  | 3A | 3B | 3C |
| Himilan 1555 | — | 47 | — |
| Himilan 1557 | — | 46 | — |
| Himilan 1855 | 80 | — | — |
| Himilan 7327 | — | — | 90 |
| TEFABLOC T3221C | — | 7 | — |
| NUCREL N1050H | 20 | — | 10 |
| Titanium dioxide | 3 | 4 | 4 |
| Light stabilizer | 0.2 | 0.2 | 0.2 |
| H3 (Shore D) | 50 | 57 | 43 |

TABLE 5

Specifications of the Golf Ball

|  | Comp. Ex. 1 | Comp. Ex. 2 | Comp. Ex. 3 | Ex. 2 | Ex. 3 | Ex. 4 |
|---|---|---|---|---|---|---|
| Composition of the core | 1F | 1H | 1K | 1G | 1I | 1J |
| First stage |  |  |  |  |  |  |
| Temperature (° C.) | 120 | 120 | 120 | 120 | 120 | 120 |
| Time (min) | 5 | 5 | 5 | 5 | 5 | 5 |
| Pressure (kgf/cm$^2$) | 35 | 35 | 35 | 35 | 35 | 35 |
| Second stage |  |  |  |  |  |  |
| Temperature (° C.) | 150 | 160 | 170 | 150 | 160 | 170 |
| Time (min) | 20 | 20 | 20 | 20 | 20 | 20 |
| Pressure (kgf/cm$^2$) | 35 | 35 | 35 | 35 | 35 | 35 |
| Composition of the mid layer | 2A | 2A | 2A | 2B | 2B | 2B |
| H2 (Shore D) | 68 | 68 | 68 | 63 | 63 | 63 |
| Composition of the cover | 3A | 3A | 3A | 3A | 3A | 3A |
| H3 (Shore D) | 50 | 50 | 50 | 50 | 50 | 50 |

TABLE 6

Specifications of the Golf Ball

|  | Ex. 1 | Ex. 5 | Ex. 6 | Ex. 7 | Ex. 8 | Ex. 9 |
|---|---|---|---|---|---|---|
| Composition of the core | 1B | 1D | 1F | 1B | 1D | 1F |
| First stage |  |  |  |  |  |  |
| Temperature (° C.) | 120 | 120 | 120 | 120 | 120 | 120 |
| Time (min) | 5 | 5 | 5 | 5 | 5 | 5 |
| Pressure (kgf/cm$^2$) | 35 | 35 | 35 | 35 | 35 | 35 |
| Second stage |  |  |  |  |  |  |
| Temperature (° C.) | 150 | 160 | 170 | 150 | 160 | 170 |
| Time (min) | 20 | 20 | 20 | 20 | 20 | 20 |
| Pressure (kgf/cm$^2$) | 35 | 35 | 35 | 35 | 35 | 35 |
| Composition of the mid layer | 2A | 2A | 2A | 2A | 2A | 2A |
| H2 (Shore D) | 68 | 68 | 68 | 68 | 68 | 68 |
| Composition of the cover | 3A | 3A | 3A | 3A | 3A | 3A |
| H3 (Shore D) | 50 | 50 | 50 | 50 | 50 | 50 |

TABLE 7

Specifications of the Golf Ball

|  | Ex. 10 | Ex. 11 | Ex. 12 | Ex. 13 | Ex. 14 | Ex. 15 |
|---|---|---|---|---|---|---|
| Composition of the core | 1B | 1D | 1F | 1B | 1D | 1F |
| First stage |  |  |  |  |  |  |
| Temperature (° C.) | 120 | 120 | 120 | 120 | 120 | 120 |
| Time (min) | 5 | 5 | 5 | 5 | 5 | 5 |
| Pressure (kgf/cm$^2$) | 35 | 35 | 35 | 35 | 35 | 35 |
| Second stage |  |  |  |  |  |  |
| Temperature (° C.) | 150 | 160 | 170 | 150 | 160 | 170 |
| Time (min) | 20 | 20 | 20 | 20 | 20 | 20 |
| Pressure (kgf/cm$^2$) | 35 | 35 | 35 | 35 | 35 | 35 |
| Composition of the mid layer | 2A | 2A | 2A | 2A | 2A | 2A |
| H2 (Shore D) | 68 | 68 | 68 | 68 | 68 | 68 |
| Composition of the cover | 3B | 3B | 3B | 3C | 3C | 3C |
| H3 (Shore D) | 57 | 57 | 57 | 43 | 43 | 43 |

TABLE 8

Specifications of the Golf Ball

|  | Ex. 16 | Ex. 17 | Ex. 18 | Comp. Ex. 4 | Comp. Ex. 5 | Comp. Ex. 6 |
|---|---|---|---|---|---|---|
| Composition of the core | 1B | 1D | 1F | 1B | 1D | 1F |
| First stage |  |  |  |  |  |  |
| Temperature (° C.) | 120 | 120 | 120 | 120 | 120 | 120 |
| Time (min) | 5 | 5 | 5 | 5 | 5 | 5 |
| Pressure (kgf/cm$^2$) | 35 | 35 | 35 | 35 | 35 | 35 |
| Second stage |  |  |  |  |  |  |
| Temperature (° C.) | 150 | 160 | 170 | 150 | 160 | 170 |
| Time (min) | 20 | 20 | 20 | 20 | 20 | 20 |
| Pressure (kgf/cm$^2$) | 35 | 35 | 35 | 35 | 35 | 35 |
| Composition of the mid layer | 2B | 2B | 2B | 2C | 2C | 2C |
| H2 (Shore D) | 63 | 63 | 63 | 59 | 59 | 59 |
| Composition of the cover | 3A | 3A | 3A | 3A | 3A | 3A |
| H3 (Shore D) | 50 | 50 | 50 | 50 | 50 | 50 |

TABLE 9

Specifications of the Golf Ball

|  | Comp. Ex. 7 | Comp. Ex. 8 | Ex. 19 | Ex. 20 |
|---|---|---|---|---|
| Composition of the core | 1A | 1C | 1E | 1F |
| First stage |  |  |  |  |
| Temperature (° C.) | 120 | 120 | 120 | 120 |
| Time (min) | 5 | 5 | 5 | 5 |
| Pressure (kgf/cm$^2$) | 115 | 115 | 115 | 35 |
| Second stage |  |  |  |  |
| Temperature (° C.) | 150 | 160 | 170 | 170 |
| Time (min) | 20 | 20 | 20 | 20 |
| Pressure (kgf/cm$^2$) | 110 | 110 | 110 | 35 |
| Composition of the mid layer | 2A | 2A | 2A | 2A |
| H2 (Shore D) | 68 | 68 | 68 | 68 |
| Composition of the cover | 3A | 3A | 3A | 3A |
| H3 (Shore D) | 50 | 50 | 50 | 50 |

TABLE 10

Evaluation Results

|  | Comp. Ex. 1 | Comp. Ex. 2 | Comp. Ex. 3 | Ex. 2 | Ex. 3 | Ex. 4 |
|---|---|---|---|---|---|---|
| Core | 1F | 1H | 1K | 1G | 1I | 1J |
| D1 (mm) | 38.6 | 38.6 | 38.6 | 38.6 | 38.6 | 38.6 |
| Ho (Shore C) | 62.5 | 59.5 | 56.5 | 62.5 | 59.5 | 56.5 |
| Hs (Shore C) | 85 | 87 | 89 | 85 | 87 | 89 |
| Hd = Hs − Ho | 22.5 | 27.5 | 32.5 | 22.5 | 27.5 | 32.5 |
| C1 (mm) | 3.70 | 3.70 | 3.70 | 3.70 | 3.70 | 3.70 |
| Mid layer | 2A | 2A | 2A | 2B | 2B | 2B |
| T2 (mm) | 1.00 | 1.00 | 1.00 | 1.00 | 1.00 | 1.00 |

TABLE 10-continued

Evaluation Results

| | Comp. Ex. 1 | Comp. Ex. 2 | Comp. Ex. 3 | Ex. 2 | Ex. 3 | Ex. 4 |
|---|---|---|---|---|---|---|
| H2 (Shore D) | 68 | 68 | 68 | 63 | 63 | 63 |
| C2 (mm) | 3.05 | 3.00 | 2.95 | 3.25 | 3.20 | 3.15 |
| Cover | 3A | 3A | 3A | 3A | 3A | 3A |
| T3 (mm) | 1.05 | 1.05 | 1.05 | 1.05 | 1.05 | 1.05 |
| H3 (Shore D) | 50 | 50 | 50 | 50 | 50 | 50 |
| C3 (mm) | 2.75 | 2.70 | 2.65 | 2.95 | 2.90 | 2.85 |
| Vx | 3.46 | 3.29 | 3.11 | 3.46 | 3.29 | 3.11 |
| Formula (1) | S. | S. | S. | S. | S. | S. |
| Vy | −0.79 | −0.84 | −0.89 | −0.54 | −0.59 | −0.64 |
| Formula (2) | S. | S. | S. | S. | S. | S. |
| C2 − C1 | −0.65 | −0.70 | −0.75 | −0.45 | −0.50 | −0.55 |
| C3 − C2 | −0.30 | −0.30 | −0.30 | −0.30 | −0.30 | −0.30 |
| Vz | 2.17 | 2.33 | 2.50 | 1.50 | 1.67 | 1.83 |
| Formula (3) | S. | S. | S. | U. | S. | S. |
| T2 + T3 | 2.05 | 2.05 | 2.05 | 2.05 | 2.05 | 2.05 |
| I#7 spin (rpm) | 105 | 55 | 5 | 140 | 90 | 40 |
| I#7 flight test (yards) | −0.6 | −0.3 | 0.0 | −0.8 | −0.5 | −0.2 |
| I#7 grade | D | C | C | D | D | C |
| Feel at impact | E | E | E | D | C | C |
| Overall evaluation | D | D | D | C | B | A |

S.: Satisfied
U.: Unsatisfied

TABLE 11

Evaluation Results

| | Ex. 1 | Ex. 5 | Ex. 6 | Ex. 7 | Ex. 8 | Ex. 9 |
|---|---|---|---|---|---|---|
| Core | 1B | 1D | 1F | 1B | 1D | 1F |
| D1 (mm) | 38.6 | 38.6 | 38.6 | 38.6 | 38.6 | 38.6 |
| Ho (Shore C) | 56 | 53 | 50 | 56 | 53 | 50 |
| Hs (Shore C) | 78 | 80 | 82 | 78 | 80 | 82 |
| Hd = Hs − Ho | 22.5 | 27.5 | 32.5 | 22.5 | 27.5 | 32.5 |
| C1 (mm) | 4.20 | 4.20 | 4.20 | 4.20 | 4.20 | 4.20 |
| Mid layer | 2A | 2A | 2A | 2A | 2A | 2A |
| T2 (mm) | 1.00 | 1.00 | 1.00 | 1.30 | 1.30 | 1.30 |
| H2 (Shore D) | 68 | 68 | 68 | 68 | 68 | 68 |
| C2 (mm) | 3.45 | 3.40 | 3.35 | 3.25 | 3.20 | 3.15 |
| Cover | 3A | 3A | 3A | 3A | 3A | 3A |
| T3 (mm) | 1.05 | 1.05 | 1.05 | 0.75 | 0.75 | 0.75 |
| H3 (Shore D) | 50 | 50 | 50 | 50 | 50 | 50 |
| C3 (mm) | 3.15 | 3.10 | 3.05 | 3.00 | 2.95 | 2.90 |
| Vx | 4.07 | 3.90 | 3.72 | 4.07 | 3.90 | 3.72 |
| Formula (1) | S. | S. | S. | S. | S. | S. |
| Vy | −0.88 | −0.93 | −0.98 | −1.14 | −1.20 | −1.27 |
| Formula (2) | S. | S. | S. | S. | S. | S. |
| C2 − C1 | −0.75 | −0.80 | −0.85 | −0.95 | −1.00 | −1.05 |
| C3 − C2 | −0.30 | −0.30 | −0.30 | −0.25 | −0.25 | −0.25 |
| Vz | 2.50 | 2.67 | 2.83 | 3.80 | 4.00 | 4.20 |
| Formula (3) | S. | S. | S. | S. | S. | S. |
| T2 + T3 | 2.05 | 2.05 | 2.05 | 2.05 | 2.05 | 2.05 |
| I#7 spin (rpm) | 50 | 0 | −50 | 30 | −20 | −70 |
| I#7 flight test (yards) | −0.3 | 0 | 0.3 | −0.2 | 0.1 | 0.4 |
| I#7 grade | C | C | C | C | C | C |
| Feel at impact | C | B | A | C | C | C |
| Overall evaluation | A | A | A | A | A | A |

S.: Satisfied
U.: Unsatisfied

TABLE 12

Evaluation Results

| | Ex. 10 | Ex. 11 | Ex. 12 | Ex. 13 | Ex. 14 | Ex. 15 |
|---|---|---|---|---|---|---|
| Core | 1B | 1D | 1F | 1B | 1D | 1F |
| D1 (mm) | 38.6 | 38.6 | 38.6 | 38.6 | 38.6 | 38.6 |
| Ho (Shore C) | 56 | 53 | 50 | 56 | 53 | 50 |
| Hs (Shore C) | 78 | 80 | 82 | 78 | 80 | 82 |
| Hd = Hs − Ho | 22.5 | 27.5 | 32.5 | 22.5 | 27.5 | 32.5 |
| C1 (mm) | 4.20 | 4.20 | 4.20 | 4.20 | 4.20 | 4.20 |
| Mid layer | 2A | 2A | 2A | 2A | 2A | 2A |
| T2 (mm) | 1.00 | 1.00 | 1.00 | 1.00 | 1.00 | 1.00 |
| H2 (Shore D) | 68 | 68 | 68 | 68 | 68 | 68 |
| C2 (mm) | 3.45 | 3.40 | 3.35 | 3.45 | 3.40 | 3.35 |
| Cover | 3B | 3B | 3B | 3C | 3C | 3C |
| T3 (mm) | 1.05 | 1.05 | 1.05 | 1.05 | 1.05 | 1.05 |
| H3 (Shore D) | 57 | 57 | 57 | 43 | 43 | 43 |
| C3 (mm) | 3.10 | 3.05 | 3.00 | 3.20 | 3.15 | 3.10 |
| Vx | 4.07 | 3.90 | 3.72 | 4.07 | 3.90 | 3.72 |
| Formula (1) | S. | S. | S. | S. | S. | S. |
| Vy | −0.88 | −0.93 | −0.98 | −0.88 | −0.93 | −0.98 |
| Formula (2) | S. | S. | S. | S. | S. | S. |
| C2 − C1 | −0.75 | −0.80 | −0.85 | −0.75 | −0.80 | −0.85 |
| C3 − C2 | −0.35 | −0.35 | −0.35 | −0.25 | −0.25 | −0.25 |
| Vz | 2.14 | 2.29 | 2.43 | 3.00 | 3.20 | 3.40 |
| Formula (3) | S. | S. | S. | S. | S. | S. |
| T2 + T3 | 2.05 | 2.05 | 2.05 | 2.05 | 2.05 | 2.05 |
| I#7 spin (rpm) | 80 | 30 | −20 | −120 | −170 | −220 |
| I#7 flight test (yards) | −0.5 | −0.2 | 0.1 | 0.7 | 1.0 | 1.3 |
| I#7 grade | D | C | C | B | B | A |
| Feel at impact | C | C | C | B | A | A |
| Overall evaluation | B | A | A | A | A | A |

S.: Satisfied
U.: Unsatisfied

TABLE 13

Evaluation Results

| | Ex. 16 | Ex. 17 | Ex. 18 | Comp. Ex. 4 | Comp. Ex. 5 | Comp. Ex. 6 |
|---|---|---|---|---|---|---|
| Core | 1B | 1D | 1F | 1B | 1D | 1F |
| D1 (mm) | 38.6 | 38.6 | 38.6 | 38.6 | 38.6 | 38.6 |
| Ho (Shore C) | 56 | 53 | 50 | 56 | 53 | 50 |
| Hs (Shore C) | 78 | 80 | 82 | 78 | 80 | 82 |
| Hd = Hs − Ho | 22.5 | 27.5 | 32.5 | 22.5 | 27.5 | 32.5 |
| C1 (mm) | 4.20 | 4.20 | 4.20 | 4.20 | 4.20 | 4.20 |
| Mid layer | 2B | 2B | 2B | 2C | 2C | 2C |
| T2 (mm) | 1.00 | 1.00 | 1.00 | 1.00 | 1.00 | 1.00 |
| H2 (Shore D) | 63 | 63 | 63 | 59 | 59 | 59 |
| C2 (mm) | 3.65 | 3.60 | 3.55 | 3.75 | 3.70 | 3.65 |
| Cover | 3A | 3A | 3A | 3A | 3A | 3A |
| T3 (mm) | 1.05 | 1.05 | 1.05 | 1.05 | 1.05 | 1.05 |
| H3 (Shore D) | 50 | 50 | 50 | 50 | 50 | 50 |
| C3 (mm) | 3.35 | 3.30 | 3.25 | 3.45 | 3.40 | 3.35 |
| Vx | 4.07 | 3.90 | 3.72 | 4.07 | 3.90 | 3.72 |
| Formula (1) | S. | S. | S. | S. | S. | S. |
| Vy | −0.63 | −0.68 | −0.73 | −0.43 | −0.48 | −0.53 |
| Formula (2) | S. | S. | S. | U. | U. | U. |
| C2 − C1 | −0.55 | −0.60 | −0.65 | −0.45 | −0.50 | −0.55 |
| C3 − C2 | −0.30 | −0.30 | −0.30 | −0.30 | −0.30 | −0.30 |
| Vz | 1.83 | 2.00 | 2.17 | 1.50 | 1.67 | 1.83 |
| Formula (3) | S. | S. | S. | U. | S. | S. |
| T2 + T3 | 2.05 | 2.05 | 2.05 | 2.05 | 2.05 | 2.05 |
| I#7 spin (rpm) | 150 | 100 | 50 | 310 | 260 | 210 |
| I#7 flight test (yards) | −0.9 | −0.6 | −0.3 | −1.9 | −1.6 | −1.3 |
| I#7 grade | D | D | C | E | E | E |
| Feel at impact | B | B | A | B | A | A |
| Overall evaluation | B | B | A | D | D | D |

S.: Satisfied
U.: Unsatisfied

TABLE 14

Evaluation Results

|  | Comp. Ex. 7 | Comp. Ex. 8 | Ex. 19 | Ex. 20 |
|---|---|---|---|---|
| Core | 1A | 1C | 1E | 1F |
| D1 (mm) | 38.6 | 38.6 | 38.6 | 38.6 |
| Ho (Shore C) | 63 | 60 | 57 | 50 |
| Hs (Shore C) | 73 | 75 | 77 | 80 |
| Hd = Hs − Ho | 10 | 15 | 20 | 30 |
| C1 (mm) | 4.20 | 4.20 | 4.20 | 4.40 |
| Mid layer | 2A | 2A | 2A | 2A |
| T2 (mm) | 1.00 | 1.00 | 1.00 | 1.00 |
| H2 (Shore D) | 68 | 68 | 68 | 68 |
| C2 (mm) | 3.50 | 3.45 | 3.40 | 3.45 |
| Cover | 3A | 3A | 3A | 3A |
| T3 (mm) | 1.05 | 1.05 | 1.05 | 1.05 |
| H3 (Shore D) | 50 | 50 | 50 | 50 |
| C3 (mm) | 3.20 | 3.15 | 3.10 | 3.15 |
| Vx | 4.50 | 4.33 | 4.16 | 3.90 |
| Formula (1) | U. | U. | S. | S. |
| Vy | −0.75 | −0.80 | −0.85 | −0.98 |
| Formula (2) | S. | S. | S. | S. |
| C2 − C1 | −0.70 | −0.75 | −0.80 | −0.95 |
| C3 − C2 | −0.30 | −0.30 | −0.30 | −0.30 |
| Vz | 2.33 | 2.50 | 2.67 | 3.17 |
| Formula (3) | S. | S. | S. | S. |
| T2 + T3 | 2.05 | 2.05 | 2.05 | 2.05 |
| I#7 spin (rpm) | 210 | 160 | 110 | −125 |
| I#7 flight test (yards) | −1.3 | −1.0 | −0.7 | 0.8 |
| I#7 grade | E | D | D | B |
| Feel at impact | E | E | D | B |
| Overall evaluation | D | D | C | B |

S.: Satisfied  U.: Unsatisfied

As shown in Tables 10 to 14, the golf ball of each Example can be characterized as having excellent flight performance and/or an excellent feel at impact. These evaluation results clearly indicate the superiority of embodiments the present disclosure.

The golf ball according to embodiments of the present disclosure can be suitable for, for example, playing golf on golf courses and practicing at driving ranges. The above descriptions are merely illustrative examples, and various modifications can be made without departing from the principles of the present disclosure.

What is claimed is:

1. A golf ball comprising a core, a mid layer positioned outside the core, and a cover positioned outside the mid layer, wherein an amount of compressive deformation C3 of the golf ball is not less than 2.80 mm, the golf ball satisfies the following mathematical formulas (1) and (2):

$$C1 > (124.8 - Hs)/11.5 \quad (1)$$

$$C2 - C1 \geq (-1/6 * C1 + (68 - H2)/20 + (5 - Hd)/100) * T2 \quad (2),$$

where

C1 is an amount of compressive deformation (mm) of the core,
C2 is an amount of compressive deformation (mm) of a sphere including the core and the mid layer,
Hd is Hs−Ho,
Ho is a hardness (Shore C) of a center the core,
Hs is a hardness (Shore C) of a surface of the core,
H2 is a hardness (Shore D) of the mid layer, and
T2 is a thickness (mm) of the mid layer, and
the golf ball further satisfies the following mathematical formula (3):

$$(C2 - C1)/(C3 - C2) \geq 1.60 \quad (3).$$

2. The golf ball according to claim 1, wherein a difference between the hardness Hs (Shore C) of the surface of the core and the hardness Ho (Shore C) of the center of the core is not less than 15 and not greater than 40.

3. The golf ball according to claim 1, wherein a sum (T2+T3) of the thickness T2 (min) of the mid layer and a thickness T3 (mm) of the cover is not less than 1.0 mm and not greater than 4.5 mm.

4. The golf ball according to claim 1, wherein the hardness H2 (Shore D) of the mid layer is not less than 45.

5. The golf ball according to claim 1, wherein a material of the cover is a resin composition, and a base material of the resin composition is an ionomer resin.

6. The golf ball according to claim 5, wherein a material of the mid layer is a resin composition, and a base material of the resin composition is an ionomer resin.

7. The golf ball according to claim 6, wherein a difference (H3−H2) between a hardness H3 of the cover and the hardness H2 of the mid layer is not greater than −11.

* * * * *